United States Patent [19]

Payne et al.

[11] 4,205,621
[45] Jun. 3, 1980

[54] SYSTEM FOR INSIDE POWDER STRIPING OF WELDED FOOD CANS

[75] Inventors: Robert D. Payne, Countryside; James E. Pazak, Westchester; Wesley J. Szpitalak, Palos Park, all of Ill.

[73] Assignee: The Continental Group, Inc., New York, N.Y.

[21] Appl. No.: 2,033

[22] Filed: Jan. 8, 1979

[51] Int. Cl.² ............................. B05B 5/02; B05C 5/02
[52] U.S. Cl. .................................... 118/622; 222/166
[58] Field of Search ........................ 118/622; 222/166

[56] References Cited

U.S. PATENT DOCUMENTS

| 1,830,598 | 11/1931 | Fagan | 427/345 X |
| 3,077,171 | 2/1963 | Gotsch et al. | 118/317 X |
| 3,526,027 | 9/1970 | Manuel et al. | 427/345 X |
| 3,882,818 | 5/1975 | Mowbray | 118/326 X |
| 3,918,401 | 11/1975 | Blakeslee | 427/30 X |
| 4,098,226 | 7/1978 | Furter | 118/622 |

FOREIGN PATENT DOCUMENTS 2704501 8/1977 Fed. Rep. of Germany.

Primary Examiner—James R. Hoffman
Attorney, Agent, or Firm—Charles E. Brown

[57] ABSTRACT

A powder stripe application system wherein substantially all powder introduced into the system is applied to side seam areas of can bodies with that powder which is not initially bonded to a can body being directly recycled within the system. The system includes a delivery nozzle which has an adjustable mounting which permits the powder stream to be positioned as desired.

19 Claims, 5 Drawing Figures

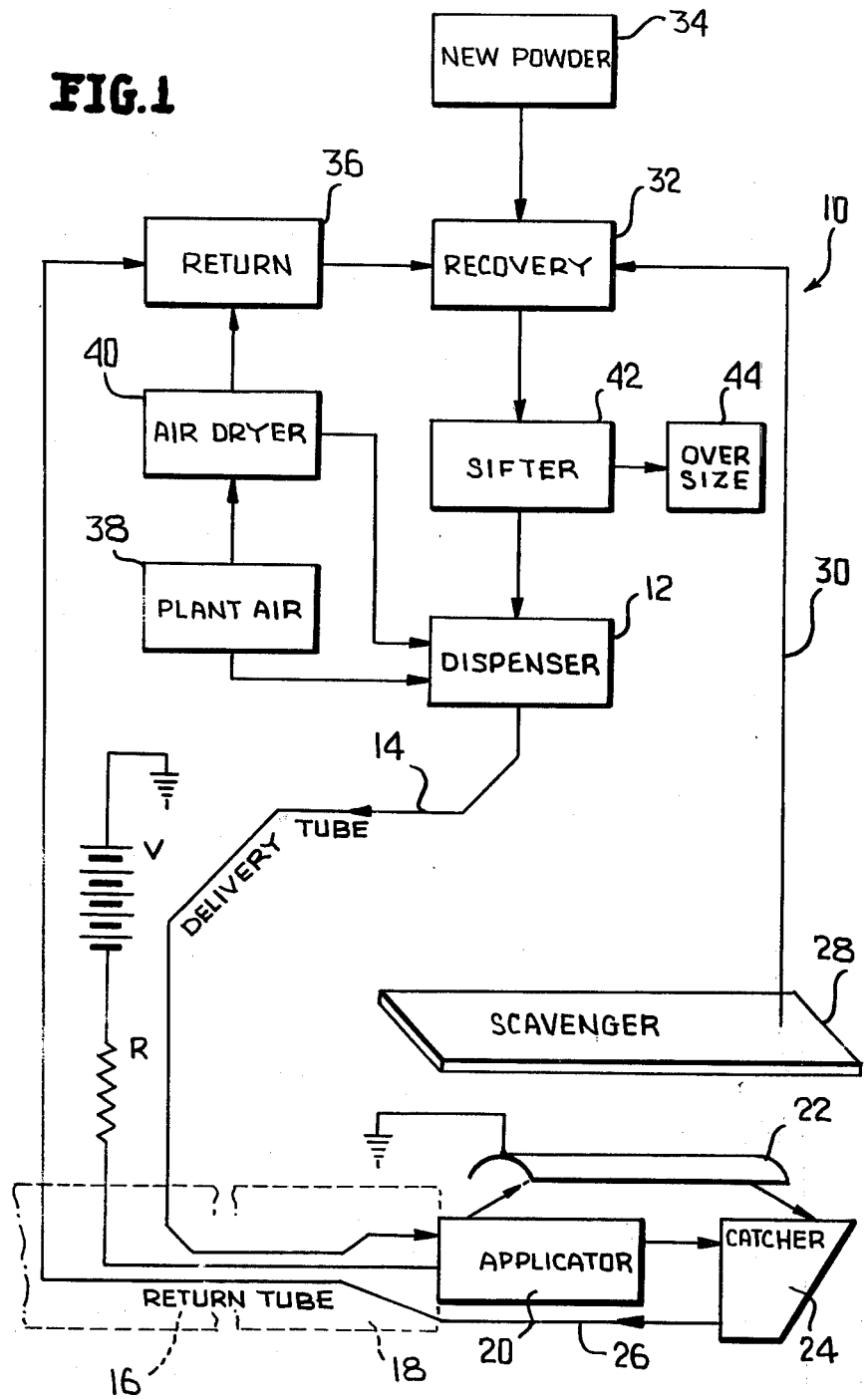

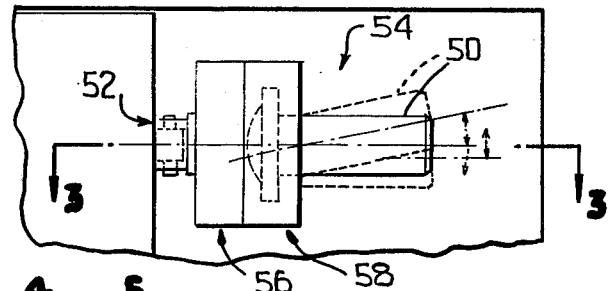
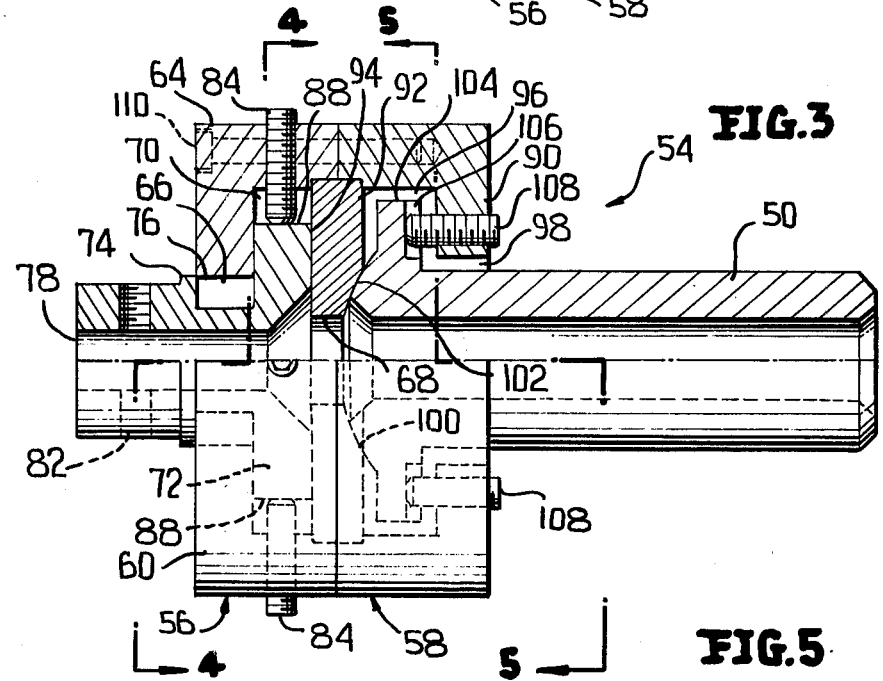
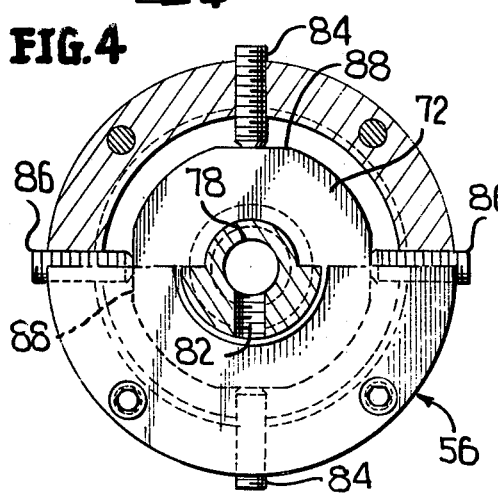
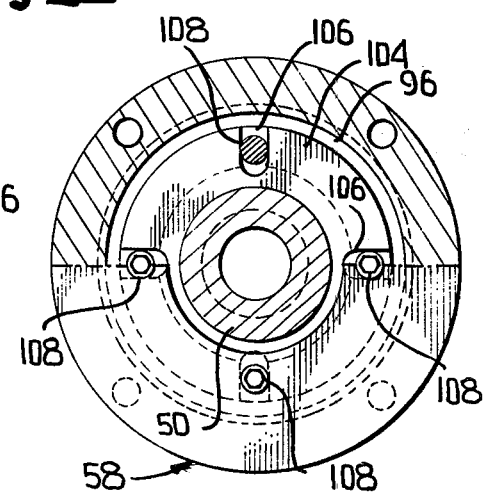

SYSTEM FOR INSIDE POWDER STRIPING OF WELDED FOOD CANS

This invention relates in general to new and useful improvements in the coating of can bodies, and more particularly to the inside powder striping of welded food cans.

The powder striping of the side seam area of welded food cans possesses a problem different from the powder striping of welded beverage cans in that the welded beverage cans, after they have been side striped, are provided with an over-coat which is baked in place with the result that any stray powder particles not applied to the side seam area are fully bonded to the interior of the can body and cannot become loose at a later date and thus form a contaminant. On the other hand, the over-coat is not required with respect to food cans, and it would not be economically feasible to provide such an over-coat merely for the purpose of assuring the bonding of stray powder particles to the interior of a food can so that it cannot later become a contaminant.

In the formation of a welded food can, no internal coating is applied along the two edges of the body blank which are to be welded together with the result that the side seam area of a welded food can has no internal coating. When the can body is formed of steel that is tin free (no tin coating), it is necessary to apply a coating to the interior of the can body both to prevent corrosion of the can body and the contamination of the food product by way of transferred metal ions. Accordingly, after the side seam has been formed it is necessary to coat the side seam area, and this may be beneficially accomplished by the electrostatic depositing of coating material in powder form. The powder so applied is heated by the inherent temperature of the side seam area due to the welding, and automatic bonding of the powder occurs in the side seam area.

It has been found that when powder application systems suitable for use in coating side seams of beverage cans have been utilized, there have been certain deficiencies particularly by way of stray powder particles. The powder particles which stray from the side seam area frequently are heated to the extent that they loosely bond to the previously applied coating, but during handling of the can come loose and thus exist within the food product as a contaminant. In accordance with this invention, it is highly desirable that the stray powder particles not become bonded to portions of the can body adjacent the side seam area, and this can be effected only by eliminating the stray powder particles from the area outside of the side seam area.

In accordance with this invention, there is provided a suitable system which not only provides means for catching the powder particles which do not adhere to the side seam area, but also to retrieve all powder which is dispensed between adjacent can bodies.

It is also a primary feature of this invention to provide a powder system wherein the powder which is directed against a can body side seam portion and does not bond thereto is immediately retrieved and recirculated directly within the system. Thus substantially all powder entering the system is applied to can bodies.

Another feature of the invention is the construction of a powder applicator wherein the delivery nozzle may be readily adjusted as required to assure the directing of powder against the side seam area of can bodies to be coated.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic view showing the overall system of the powder stripe applicator of this invention.

FIG. 2 is a schematic top plan view of the powder applicator, showing the several adjusted positions of the delivery nozzle.

FIG. 3 is a longitudinal sectional view taken through the applicator generally along the line 3—3 of FIG. 2, and shows the constructional details of the mounting of the delivery nozzle.

FIG. 4 is a transverse sectional view taken generally along the line 4—4 of FIG. 3, and shows the adjustable mounting of the nozzle housing on a supply fitting.

FIG. 5 is a transverse sectional view taken generally along the line 5—5 of FIG. 3, and shows the adjustable mounting of the delivery nozzle with respect to the housing.

Reference is first made to FIG. 1 wherein the powder stripe application system of this invention is best illustrated and is identified by the numeral 10. First of all, the system 10 includes a dispenser 12 which delivers to a delivery tube 14 an air entrained supply of powder. The delivery tube extends through the customary welding horn 16 and horn extension 18 to an applicator 20 which in itself is not part of this invention. The applicator 20, however, will be provided with suitable means (not shown) for defining a sealed area of which one wall will be defined by a side seam area of a can body being striped. A suitable delivery nozzle, to be described in detail, delivers the powder into the confined area and generally directs the powder against the side seam area as is schematically illustrated in FIG. 1. The can body is only partially shown and is identified by the numeral 22.

A large portion of the delivered powder becomes electrostatically bonded to the side seam area and is then fused in situ by the inherent heat resulting from the formation of the side seam being welded. Others of the powder particles bounce off the side seam area and enter into an upper part of a catcher 24. Certain powder particles flowing directly through the applicator 20 enter the upstream side of the catcher 24 as is diagrammatically illustrated.

The catcher 24 in itself is also not part of this invention and normally will be supported from the applicator 20. The catcher 24 is provided with a return tube 26 which extends through the horn 16 and horn extension 18 externally of the welding apparatus.

It is to be understood that the can bodies will be delivered to the applicator in slightly spaced relation so that between each can body there will be a spray of powder particles which tend to exit the system. These powder particles, however, are caught by a scavenger 28 which is positioned adjacent the applicator 20 and which is provided with a return line 30. The system 10 includes a recovery unit 32 which may be in the form of an integral cyclone/bag house which collects new, returned and scavenged powder and initiates powder conditioning including drying and mixing. The constructional details of the recovery unit 32 may vary.

It will be seen that the recovery unit 32 receives new powder, as required, from a new powder supply 34. The new powder is pneumatically delivered into the system.

The return line 30 also opens into the recovery unit and returns the powder particles which escape between adjacent can bodies. This return is also of a pneumatic delivery type.

The return tube 26 has a suction formed therein generally by way of a vacuum flow transducer which forms a major component of the return unit which is generally identified by the numeral 36. The return unit requires air under pressure to operate the same.

It is to be understood that the catcher 24 will receive not only non-applied powder, but also any poorly adhered powder which falls off just after deposition. This return powder may include particles which are heat bonded together, and therefore the return may be considered to include oversize and agglomerated particles.

Plant air is directed by means of a suitable unit 38 both into the dispenser 12 under pressure and into an air dryer 40 which removes oil, water and particulate contamination from air used to condition, meter, deliver and return powder. Part of the conditioned air is directed into the vacuum flow transducer of the return unit 36 while other is directed into the dispenser 12.

The powder particles collected by the catcher 24 and the scavenger 28 are mixed with the new powder from the new powder supply 34 in the recovery unit 32 and are pneumatically directed to a sieve 42 which separates the oversize and agglomerated particles and discharges them into an oversize collector 44. The remaining particles are directed into the dispenser for delivery to the applicator.

It is to be understood that the applicator has associated therewith a D.C. power supply which will be connected to corona charging needles (not shown), and that the can bodies being side striped will be grounded so that the charged powder particles will be directed toward and adhered to the side seam area.

In order that the power particles may be properly directed to the side seam area of a can body and at the desired angle to the can body, there are provided in the applicator means for adjustably mounting a delivery nozzle 50. First of all, it is to be understood that the applicator will include a supply fitting 52 which, in turn, is carried by and suitably coupled to the delivery tube 14. The mounting means mounting the delivery nozzle 50 for adjustment relative to the supply fitting 52 in part includes a housing generally identified by the numeral 54. The housing 54 is of a two-piece construction and includes a first housing half 56 associated with the supply fitting 52 and a second housing half 58 associated with the delivery nozzle 50.

The housing half 56 is formed to include an outer wall 60 and an inner wall 62 joined by a peripheral portion 64. The outer wall 60 has an axial opening 66 therethrough while the inner wall 62 has a further axial opening 68 therethrough which is aligned with but is of a smaller size than the opening 66.

Between the two walls 60, 62 the housing half 56 defines a socket 70 in which there is received a mounting flange 72 of the supply fitting 52. The supply fitting 52 is also provided with a closure flange 74 which is spaced from the flange 72 and with the exterior of the supply fitting 52 being undercut as at 76 in alignment with the outer wall 60. The supply fitting 52 is provided with a through bore 78 having a flared inner end portion 80.

If desired, the supply fitting may be telescoped over the free end of the delivery tube 14 and secured in place thereon by means of a set screw threaded into a radial bore 82.

It will be seen that the flange 72 is snugly received between the side walls 60 and 62 and generally forms a seal therewith. On the other hand, the flange, together with the remainder of the supply fitting 52, is radially adjustable within the socket 70 and the housing half 56 by two pairs of adjusting screws 84 and 86, as is best shown in FIG. 4. Preferably the periphery of the flange 72 has flats 88 thereon for engagement between adjusting screws 86. Thus when the supply fitting 52 has its axis horizontally disposed, the housing 54 together with the delivery tube 50 may be selectively adjusted both vertically and horizontally.

The housing half 58 also includes an outer wall 90 and an inner wall 92 which are connected together by a peripheral portion 94 and define therein a socket 96. The outer wall 90 has an oversize opening 98 therethrough loosely receiving the delivery tube 50.

The central portion of the inner wall 92 has a bore therethrough aligned with the bore 68, the bore in the inner wall 92 being defined by a spherical seat 100. The inner end of the delivery nozzle 50 is provided with a spherical surface 102 which engages the spherical seat 100 and provides a seal between the delivery nozzle 50 and the housing 54 while at the same time permitting the adjustment of the delivery nozzle 50 relative to the housing 54 for angular pitch and yaw. In order to adjust the angular pitch and yaw, the inner end portion of the delivery nozzle 50 is provided with a flange 104 which is positioned within the socket 96. The flange 104 has a series of radial recesses 106 in an outermost face thereof with these recesses having engaged therein inner ends of adjusting screws 108 which are arranged in two sets.

Finally, the housing halves 56, 58 are secured together by a plurality of axially extending fasteners 110 which permit the halves 56, 58 to be rotatably adjusted relative to one another. Thus the housing 54 and the delivery nozzle 50 may be adjusted about a horizontal axis in a rotational manner.

Although only a preferred embodiment of the invention has been specifically illustrated and described herein, it is to be understood that minor variations may be made in the powder stripe application system and the mounting of the delivery nozzle without departing from the spirit and scope of the invention as defined by the appended claims.

What is claimed as new is:

1. A continuous closed loop powder stripe application system for electrostatically applying powder to members moving along a predetermined path in spaced relation, said system comprising an applicator, a catcher for receiving excess powder, a scavenger for receiving powder dispensed between members, a recovery unit for receiving powder from said scavenger and said catcher, a return system between said catcher and said recovery unit, means connecting said scavenger to said recovery unit, a new powder supply connected to said system in accordance with powder utilization, a dispenser for receiving powder from said recovery unit, and a delivery tube for delivering powder to said applicator.

2. A system according to claim 1 wherein there are means in advance of said dispenser for removing oversize powder particles from said system.

3. A system according to claim 2 wherein said means for removing oversize particles is disposed between said recovery unit and said dispenser.

4. A system according to claim 2 wherein said means for removing oversize particles is disposed between said recovery unit and said dispenser and includes a sieve.

5. A system according to claim 1 wherein said return unit includes suction means actuated by air under pressure and said dispenser has an air supply for effecting the delivery of powder to said applicator under air entrained conditions.

6. A system according to claim 1 wherein said applicator includes a generally horizontally extending delivery nozzle and means mounting said delivery nozzle for vertical and horizontal translation.

7. A system according to claim 1 wherein said applicator includes a generally horizontally extending delivery nozzle and means mounting said delivery nozzle for vertical and horizontal translation and for angular pitch and yaw.

8. A system according to claim 1 wherein said applicator includes a generally horizontally extending delivery nozzle and means mounting said delivery nozzle for vertical and horizontal translation and for rotation about a horizontal axis.

9. A system according to claim 1 wherein said applicator includes a generally horizontally extending delivery nozzle and means mounting said delivery nozzle for vertical and horizontal translation, for angular pitch and yaw, and for rotation about a horizontal axis.

10. A system according to claim 1 wherein said applicator includes a generally horizontally extending delivery nozzle and means for mounting said delivery nozzle for angular pitch and yaw.

11. A system according to claim 1 wherein said applicator includes a generally horizontally extending delivery nozzle and means for mounting said delivery nozzle for angular pitch and yaw and for rotation about a horizontal axis.

12. A system according to claim 1 wherein said applicator includes a generally horizontally extending delivery nozzle and means mounting said delivery nozzle for rotation about a horizontal axis.

13. A powder applicator comprising a supply fitting, a separately formed delivery nozzle and means mounting said delivery nozzle for vertical and horizontal translation relative to said supply fitting when said supply fitting is horizontally disposed.

14. The powder applicator of claim 13 wherein said mounting means include means mounting said delivery nozzle for angular pitch and yaw.

15. The powder applicator of claim 13 wherein said mounting means include means mounting said delivery nozzle for angular pitch and yaw and for rotation about a horizontal axis.

16. The powder applicator of claim 13 wherein said mounting means includes a housing formed of two halves. one of said housing halves defining a socket, said supply fitting having a flange seated in said socket for radial movement, and sets of adjusting elements for engaging said flange adjusting said housing and said delivery nozzle vertically and horizontally relative to said supply fitting.

17. The powder applicator of claim 14 wherein said mounting means includes a housing formed of two halves, one of said housing halves defining a socket, said socket including a spherical seat, said delivery nozzle having a spherical end portion engaging said seat, a positioning flange carried by said delivery nozzle disposed within said socket, and axial sets of adjusting elements engaging said positioning flange and adjusting said angular pitch and yaw.

18. The powder applicator of claim 17 wherein the other of said housing halves defines a second socket, said supply fitting has a second flange seated in said second socket for radial movement, and sets of adjusting elements for engaging said second flange and adjusting said housing and delivery nozzle vertically and horizontally relative to said supply fitting.

19. The powder dispenser of claim 18 wherein said housing halves have a common axis, and means for joining together said housing halves in selected rotated positions relative to said common axis.

* * * * *